(12) United States Patent
Johnson et al.

(10) Patent No.: US 11,597,086 B2
(45) Date of Patent: Mar. 7, 2023

(54) FOOD-SAFE, WASHABLE INTERFACE FOR EXCHANGING TOOLS

(71) Applicant: The Charles Stark Draper Laboratory, Inc., Cambridge, MA (US)

(72) Inventors: David M. S. Johnson, Cambridge, MA (US); Justin Rooney, New York, NY (US); Cody Chu, Somerville, MA (US); Luis Trueba, San Marcos, TX (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 634 days.

(21) Appl. No.: 16/570,955

(22) Filed: Sep. 13, 2019

(65) Prior Publication Data

US 2020/0086503 A1  Mar. 19, 2020

Related U.S. Application Data

(60) Provisional application No. 62/731,398, filed on Sep. 14, 2018, provisional application No. 62/730,933,
(Continued)

(51) Int. Cl.
*G06F 17/00* (2019.01)
*B25J 9/16* (2006.01)
(Continued)

(52) U.S. Cl.
CPC .......... *B25J 9/1666* (2013.01); *B25J 9/0009* (2013.01); *B25J 9/16* (2013.01); *B25J 9/161* (2013.01);
(Continued)

(58) Field of Classification Search
CPC . B25J 9/1666; B25J 9/0009; B25J 9/16; B25J 9/161; B25J 9/1633; B25J 9/1653;
(Continued)

(56) References Cited

U.S. PATENT DOCUMENTS 4,512,709 A * 4/1985 Hennekes ............ B23Q 1/0063
901/41
4,513,709 A    4/1985 Hennekes
(Continued)

FOREIGN PATENT DOCUMENTS

CN         10313068 A    1/2017
CN         107092209 A   8/2017
(Continued)

OTHER PUBLICATIONS

Yang et al., "Obstacle Avoidance through Deep Networks based Intermediate Perception", Apr. 27, 2017, The Robotics Instiute, Carnegie Mellon University (Year: 2017).
(Continued)

*Primary Examiner* — Ronnie M Mancho
(74) *Attorney, Agent, or Firm* — Hamilton, Brook, Smith & Reynolds, P.C.

(57) ABSTRACT

A problem with current food service robots is making the robots safe to work around food. A solution provided by the present disclosure is a food-safe tool switcher and corresponding tool. The tool switcher can mate with a variety of tools, which can be molded or 3D printed out of food-safe materials into a single-part, instead of constructed modularly. This provides for easier cleaning.

10 Claims, 9 Drawing Sheets

Related U.S. Application Data filed on Sep. 13, 2018, provisional application No. 62/730,947, filed on Sep. 13, 2018, provisional application No. 62/730,703, filed on Sep. 13, 2018, provisional application No. 62/730,934, filed on Sep. 13, 2018, provisional application No. 62/730,918, filed on Sep. 13, 2018.

(51) Int. Cl.

| | |
|---|---|
| *B25J 13/00* | (2006.01) |
| *B25J 13/08* | (2006.01) |
| *G06N 3/08* | (2023.01) |
| *G10L 15/22* | (2006.01) |
| *B65G 1/137* | (2006.01) |
| *B25J 9/00* | (2006.01) |
| *B25J 15/00* | (2006.01) |
| *G06Q 10/0631* | (2023.01) |
| *B25J 11/00* | (2006.01) |
| *B25J 15/04* | (2006.01) |
| *B25J 19/02* | (2006.01) |
| *G05D 1/02* | (2020.01) |
| *B25J 19/00* | (2006.01) |
| *G06V 40/20* | (2022.01) |
| *H04L 67/12* | (2022.01) |
| *G05B 19/4061* | (2006.01) |
| *A47J 44/00* | (2006.01) |

(52) U.S. Cl.
CPC .......... *B25J 9/1633* (2013.01); *B25J 9/1653* (2013.01); *B25J 9/1664* (2013.01); *B25J 9/1674* (2013.01); *B25J 9/1676* (2013.01); *B25J 9/1682* (2013.01); *B25J 9/1687* (2013.01); *B25J 9/1697* (2013.01); *B25J 11/0045* (2013.01); *B25J 13/003* (2013.01); *B25J 13/085* (2013.01); *B25J 13/088* (2013.01); *B25J 15/0052* (2013.01); *B25J 15/0408* (2013.01); *B25J 19/0083* (2013.01); *B25J 19/023* (2013.01); *B65G 1/137* (2013.01); *G05D 1/02* (2013.01); *G06N 3/08* (2013.01); *G06Q 10/06316* (2013.01); *G06V 40/28* (2022.01); *G10L 15/22* (2013.01); *A47J 44/00* (2013.01); *G05B 19/4061* (2013.01); *G05B 2219/32335* (2013.01); *G05B 2219/39001* (2013.01); *G05B 2219/39091* (2013.01); *G05B 2219/39319* (2013.01); *G05B 2219/39342* (2013.01); *G05B 2219/39468* (2013.01); *G05B 2219/40201* (2013.01); *G05B 2219/40202* (2013.01); *G05B 2219/40411* (2013.01); *G05B 2219/40497* (2013.01); *G05B 2219/45111* (2013.01); *G05B 2219/49157* (2013.01); *G05B 2219/50391* (2013.01); *H04L 67/12* (2013.01)

(58) Field of Classification Search
CPC ...... B25J 9/1664; B25J 9/1674; B25J 9/1676; B25J 9/1682; B25J 9/1687; B25J 9/1697; B25J 11/0045; B25J 13/003; B25J 13/085; B25J 13/088; B25J 15/0052; B25J 15/0408; B25J 19/0083; B25J 19/023; B65G 1/137; G05D 1/02; G06N 3/08; G06Q 10/06316; G06V 40/28; G10L 15/22; A47J 44/00; G05B 19/4061; G05B 2219/32335; G05B 2219/39001; G05B 2219/39091; G05B 2219/39319; G05B 2219/39342; G05B 2219/39468; G05B 2219/40201; G05B 2219/40202; G05B 2219/40411; G05B 2219/40497; G05B 2219/45111; G05B 2219/49157; G05B 2219/50391; H04L 67/12
USPC .......................................................... 483/1
See application file for complete search history.

(56) References Cited

U.S. PATENT DOCUMENTS

| | | | |
|---|---|---|---|
| 4,604,787 A * | 8/1986 | Silvers, Jr. | B23Q 7/046 414/730 |
| 4,611,377 A * | 9/1986 | McCormick | B23Q 3/15553 29/407.05 |
| 4,624,043 A * | 11/1986 | Bennett | B25J 15/0491 294/86.4 |
| 4,676,142 A | 6/1987 | McCormick | |
| 4,875,275 A * | 10/1989 | Hutchinson | B25J 15/04 279/93 |
| 4,896,357 A | 1/1990 | Hatano | |
| 4,904,514 A | 2/1990 | Morrison et al. | |
| 5,018,266 A * | 5/1991 | Hutchinson | B25J 15/04 901/41 |
| 5,044,063 A * | 9/1991 | Voellmer | B23Q 3/15553 483/902 |
| 5,131,706 A * | 7/1992 | Appleberry | B25J 15/04 294/119.1 |
| 5,136,223 A | 8/1992 | Karakama | |
| 5,360,249 A * | 11/1994 | Monforte | B25J 15/0475 294/902 |
| 5,396,346 A | 3/1995 | Nakayama | |
| 5,774,841 A | 6/1998 | Salazar et al. | |
| 5,879,277 A * | 3/1999 | Dettman | B25J 15/0491 901/41 |
| 6,223,110 B1 | 4/2001 | Rowe et al. | |
| 6,427,995 B1 * | 8/2002 | Steinwall | B25B 1/2405 269/283 |
| 6,569,070 B1 * | 5/2003 | Harrington | B25J 15/04 901/41 |
| 6,678,572 B1 | 1/2004 | Oh | |
| 8,095,237 B2 * | 1/2012 | Habibi | B25J 9/1692 318/568.13 |
| 9,186,795 B1 | 11/2015 | Edsinger et al. | |
| 9,189,742 B2 | 11/2015 | London | |
| 9,259,840 B1 | 2/2016 | Chen | |
| 9,346,164 B1 | 5/2016 | Edsinger et al. | |
| 9,427,876 B2 | 8/2016 | Mozeika et al. | |
| 9,659,225 B2 | 5/2017 | Joshi et al. | |
| 9,744,668 B1 | 8/2017 | Russell et al. | |
| 9,547,306 B2 | 10/2017 | Sepulveda | |
| 10,131,053 B1 | 11/2018 | Sampedro et al. | |
| 10,427,306 B1 * | 10/2019 | Quinlan | B25J 11/008 |
| 11,016,491 B1 | 5/2021 | Millard | |
| 11,116,593 B2 | 9/2021 | Hashimoto et al. | |
| 11,351,673 B2 | 6/2022 | Zito et al. | |
| 2002/0144565 A1 | 10/2002 | Ambrose | |
| 2002/0151848 A1 | 10/2002 | Capote et al. | |
| 2002/0158599 A1 | 10/2002 | Fujita | |
| 2003/0060930 A1 | 3/2003 | Fujita | |
| 2004/0039483 A1 | 2/2004 | Kemp et al. | |
| 2004/0172380 A1 * | 9/2004 | Zhang | B25J 9/1682 |
| 2005/0004710 A1 | 1/2005 | Shimomura et al. | |
| 2005/0171643 A1 | 8/2005 | Sabe et al. | |
| 2005/0193901 A1 * | 9/2005 | Buehler | A23L 5/10 99/468 |
| 2005/0283475 A1 | 12/2005 | Beranik | |
| 2006/0137164 A1 | 6/2006 | Kraus | |
| 2006/0141200 A1 | 6/2006 | D'Amdreta | |
| 2006/0165953 A1 | 7/2006 | Castelli | |
| 2007/0233321 A1 | 10/2007 | Suzuki | |
| 2007/0274812 A1 | 11/2007 | Ban et al. | |
| 2007/0276539 A1 | 11/2007 | Habibi et al. | |
| 2008/0059178 A1 | 3/2008 | Yamamoto et al. | |
| 2008/0161970 A1 | 7/2008 | Adachi et al. | |
| 2008/0201016 A1 | 8/2008 | Finlay | |
| 2008/0237921 A1 | 10/2008 | Butterworth | |

(56) References Cited

U.S. PATENT DOCUMENTS

| | | | |
|---|---|---|---|
| 2009/0075796 A1* | 3/2009 | Doll | B25J 15/0491 901/41 |
| 2009/0292298 A1* | 11/2009 | Lin | B25J 15/0061 606/130 |
| 2010/0114371 A1 | 5/2010 | Tsusaka et al. | |
| 2010/0292707 A1 | 11/2010 | Ortmaier | |
| 2011/0060462 A1 | 3/2011 | Aurnhammer et al. | |
| 2011/0256995 A1 | 10/2011 | Takazakura et al. | |
| 2012/0016678 A1 | 1/2012 | Gruber | |
| 2012/0255388 A1 | 10/2012 | McClosky | |
| 2012/0290134 A1 | 11/2012 | Zhao et al. | |
| 2013/0079930 A1 | 3/2013 | Mistry | |
| 2013/0103198 A1 | 4/2013 | Nakamoto et al. | |
| 2014/0067121 A1 | 3/2014 | Brooks | |
| 2014/0163736 A1 | 6/2014 | Azizian et al. | |
| 2015/0051734 A1 | 2/2015 | Zheng | |
| 2015/0114236 A1 | 4/2015 | Roy | |
| 2015/0148953 A1 | 5/2015 | Laurent et al. | |
| 2015/0149175 A1 | 5/2015 | Hirata et al. | |
| 2015/0178953 A1 | 5/2015 | Laurent | |
| 2015/0277430 A1* | 10/2015 | Linnell | G05B 19/409 700/257 |
| 2015/0375402 A1 | 12/2015 | D Andreta | |
| 2016/0016315 A1 | 1/2016 | Kuffner et al. | |
| 2016/0073644 A1 | 3/2016 | Dickey | |
| 2016/0075023 A1 | 3/2016 | Sisbot | |
| 2016/0291571 A1 | 10/2016 | Cristiano | |
| 2016/0372138 A1 | 12/2016 | Shinkai et al. | |
| 2017/0004406 A1 | 1/2017 | Aghamohammadi | |
| 2017/0080565 A1 | 3/2017 | Dalibard | |
| 2017/0087722 A1 | 3/2017 | Aberg et al. | |
| 2017/0133009 A1 | 5/2017 | Cho et al. | |
| 2017/0168488 A1 | 6/2017 | Wierzynski | |
| 2017/0326728 A1 | 11/2017 | Prats | |
| 2017/0334066 A1 | 11/2017 | Levine | |
| 2017/0354294 A1 | 12/2017 | Shivaiah | |
| 2017/0361461 A1 | 12/2017 | Tan | |
| 2018/0056520 A1 | 3/2018 | Ozaki | |
| 2018/0070776 A1 | 3/2018 | Ganninger | |
| 2018/0121994 A1 | 5/2018 | Matsunaga et al. | |
| 2018/0144244 A1 | 5/2018 | Masoud et al. | |
| 2018/0147718 A1 | 5/2018 | Oleynik | |
| 2018/0147723 A1 | 5/2018 | Vijayanarasimhan | |
| 2018/0150661 A1 | 5/2018 | Hall et al. | |
| 2018/0200014 A1 | 7/2018 | Bonny et al. | |
| 2018/0200885 A1 | 7/2018 | Ikeda et al. | |
| 2018/0202819 A1 | 7/2018 | Mital | |
| 2018/0214221 A1* | 8/2018 | Crawford | B25J 15/0441 |
| 2018/0257221 A1 | 9/2018 | Toothaker et al. | |
| 2018/0275632 A1 | 9/2018 | Zhang et al. | |
| 2018/0338504 A1 | 11/2018 | Lavri et al. | |
| 2018/0345479 A1 | 12/2018 | Martino et al. | |
| 2018/0348783 A1 | 12/2018 | Pitzer et al. | |
| 2018/0354140 A1 | 12/2018 | Watanabe | |
| 2019/0001489 A1 | 1/2019 | Hudson et al. | |
| 2019/0039241 A1* | 2/2019 | Langenfeld | B25J 9/161 |
| 2019/0049970 A1 | 2/2019 | Djuric et al. | |
| 2019/0056751 A1 | 2/2019 | Ferguson et al. | |
| 2019/0066680 A1 | 2/2019 | Woo et al. | |
| 2019/0291277 A1 | 9/2019 | Oleynik | |
| 2019/0310611 A1 | 10/2019 | Jain | |
| 2019/0321989 A1 | 10/2019 | Anderson et al. | |
| 2019/0381617 A1 | 12/2019 | Patrini et al. | |
| 2020/0023520 A1 | 1/2020 | Yoshizumi | |
| 2020/0030966 A1 | 1/2020 | Hasegawa | |
| 2020/0047349 A1 | 2/2020 | Sinnet et al. | |
| 2020/0070355 A1 | 3/2020 | Neumann et al. | |
| 2020/0073358 A1 | 3/2020 | Dedkov et al. | |
| 2020/0086437 A1 | 3/2020 | Johnson | |
| 2020/0086482 A1 | 3/2020 | Johnson | |
| 2020/0086485 A1 | 3/2020 | Johnson | |
| 2020/0086487 A1 | 3/2020 | Johnson | |
| 2020/0086497 A1 | 3/2020 | Johnson | |
| 2020/0086498 A1 | 3/2020 | Johnson | |
| 2020/0086502 A1 | 3/2020 | Johnson | |
| 2020/0086509 A1 | 3/2020 | Johnson | |
| 2020/0087069 A1 | 3/2020 | Johnson | |
| 2020/0090099 A1 | 3/2020 | Johnson | |
| 2020/0298403 A1 | 9/2020 | Nilsson et al. | |
| 2022/0066456 A1 | 3/2022 | Ebrahimi et al. | |

FOREIGN PATENT DOCUMENTS

| | | |
|---|---|---|
| DE | 3723329 A | 1/1988 |
| DE | 3823102 A1 | 1/1990 |
| EP | 138461 A2 | 4/1985 |
| EP | 474881 A1 | 3/1992 |
| EP | 1145804 A1 | 10/2001 |
| EP | 2011610 A2 | 1/2019 |
| FR | 3015334 A1 | 6/2015 |
| GB | 2550396 A | 11/2017 |
| JP | 2004295620 | 10/2004 |
| JP | 200849462 A | 3/2008 |
| JP | 2020028957 | 2/2020 |
| WO | 99/03653 A1 | 1/1999 |
| WO | 2005072917 A1 | 11/2005 |
| WO | 2009045827 A2 | 4/2009 |
| WO | 20150117156 A | 8/2015 |
| WO | 20170197170 A1 | 11/2017 |
| WO | 20180133861 A1 | 7/2018 |
| WO | 2020056279 A1 | 3/2020 |
| WO | 2020056295 A1 | 3/2020 |
| WO | 2020056301 A1 | 3/2020 |
| WO | 2020056353 A1 | 3/2020 |
| WO | 2020056362 A1 | 3/2020 |
| WO | 2020056373 A1 | 3/2020 |
| WO | 2020056374 A1 | 3/2020 |
| WO | 2020056375 A1 | 3/2020 |
| WO | 2020056376 A1 | 3/2020 |
| WO | 2020056377 A1 | 3/2020 |
| WO | 2020056380 A1 | 3/2020 |

OTHER PUBLICATIONS

Anandan, T.M., "The Shrinking Footprint of Robot Safety", Robotics Online, Oct. 6, 2014. https://www.robotics.org/content-detail.cfm/Industrial-Robotics-Industry-Insights/The-ShrinkingFootprint-of-Robot-Safety/content_id/5059.

Blutinger, J., et al., "Scoop: Automating the Ice Cream Scooping Process", Introduction to Robotics MECE E4602, Group 8 Final Project, Dec. 2016.

Bollini, M., et al., "Interpreting and Executing Recipes with a Cooking Robot", Experimental Robotics, 2013.

Cao, Z., et al. "Realtime Multi-Person 2D Pose Estimation using Part Affinity Fields", Proceedings of the IEEE Conference on Computer Vision and Pattern Recognition. 2017.

Dantam, N.T., et al. "Incremental Task and Motion Planning" A Constraint-Based Approach, Robotics: Science and Systems 12, 00052, 2016.

Ferrer-Mestres, J., et al., "Combined Task and Motion Planning As A Classical Al Planning" arXiv preprint arXiv: 1706.06927, 2017—arxiv.org; Jun. 21, 2017.

Kaelbling, L.P, et al., "Integrated task and motion planning in beliefs space" The International Journal of Robotics Research; 0(0) 1-34; 2013.

Martinez, J., et al., "On human motion prediction using recurrent neural networks." Proceedings of the IEEE Conference on Computer Vision and Pattern Recognition. 2017.

Nedunuri, S., et al., "SMT-Based Synthesis of Integrated Task and Motion Plan from Plan Outlines"; the Proceedings of the 2014 IEEE Intl. Conf. on Robotics and Automation (ICRA2014).

Saxena, A., et al., "RoboBrain: Large-Scale Knowledge Engine for Robots", arXiv preprint arXiv:1412.0691 (2014).

Schenck, C., et al., "Learning Robotic Manipulation of Granular Media", 1st Conference on Robot Learning, arXiv:1709.02833, Oct. 25, 2017.

Shimizu, T. and Kubota, T., "Advanced Sampling Scheme Based on Environmental Stiffness for a Smart Manipulator", Robot Intelligence Technology and Applications, pp. 19-208. 2012.

(56) References Cited

OTHER PUBLICATIONS

Srivastava, S., et al. "Combined Task and Motion Planning Through an Extensible Planner-Independent Interface Layer"; 2014 IEEE international conference on robotics and automation (ICRA), 639-646.
Stentz, A., et al., "A Robotic Excavator for Autonomous Truck Loading", In Proceedings of the IEEE/RSJ International Conference on Intelligent Robotic Systems, 1998.
Villegas, et al, "Learning to Generate Long-term Future via Hierarchical Prediction", In Proceedings of the 34th International Conference on Machine Learning (ICML), 2017.
Walker, J., et al., "The pose knows: Video forecasting by generating pose futures", In The IEEE International Conference on Computer Vision (ICCV), Oct. 2017.
Watson, J,. Kevin, et al. "Use of Voice Recognition for Control of a Robotic Welding Workcell", IEEE Control Systems Magazine; p. 16-18; (ISSN 0272-1708); 7 , Jun. 1, 1987.
Wong, J.M., et al., "SegICP-DSR: Dense Semantic Scene Reconstruction and Registration", Draper, arXiv: 1711.02216; Nov. 6, 2017.
Wong, J.M., et al., "SegICP: Integrated Deep Semantic Segmentation and Pose Estimation", Massachusetts Institute of Technology, 2017 IEEE/RSJ International Conference on Intelligent Robots and Systems (IROS); Sep. 5, 2017.
Wu, J., et al., "Real-Time Object Pose Estimation with Pose Interpreter Networks", IEEE/RSJ International Conference an Intelligent Robots and Systems (IROS), 2018.
Ye, G., et al., "Demonstration-Guided Motion Planning" Robotics Research. Springer Tracts in Advanced Robotics, vol. 100, 2017.
International Search Report and Written Opinion for PCT/US2019/051148 dated Dec. 12, 2019 entitled "Food-Safe, Washable, Thermally-Conductive Robot Cover".
Anonymous: "Pate a pizza fine—Notre recette avec photos—Meilleur du Chef," Retrieved from the Internet: URL: https://www.meilleurduchef.com/fr/recette/pate-pizza-fine.html# [retrieved on Dec. 5, 2019].
International Search Report and Written Opinion for PCT/US2019/051176 dated Dec. 12, 2019 entitled "Determining How To Assemble A Meal".
International Search Report and Written Opinion for PCT/US2019/051175 dated Jan. 3, 2020 entitled Stopping Robot Motion Based On Sound Cues .
Dexai Robotics: "Alfred Sous-Chef scooping ice-cream" Youtube, retrieved from Internet Jun. 8, 2018. https://www.youtube.com/watch?v=caNG4qrZhRU.
International Search Report and Written Opinion for PCT/US2019/051179 dated Jan. 9, 2020 entitled "An Adaptor for Food-Safe, Bin-Compatible, Washable, Tool-Changer Utensils".
International Search Report and Written Opinion for PCT/US2019/051177 dated Jan. 9, 2020 entitled "Voice Modification To Robot Motion Plans".
International Search Report and Written Opinino for PCT/US2019/051183 dated Jan. 14, 2020 entitled "Locating And Attaching Interchangeable Tools In-Situ".
International Search Report and Written Opinion for PCT/US2019/051067 dated Jan. 16, 2020 entitled "Robot nteraction With Human Co-Workers".
International Search Report and Written Opinion for PCT/US2019/051161 dated Jan. 15, 2020 entitled "Food-Safe, Nashable Interface For Exchanging Tools".
ATI Industrial Automation: Automatic/RoboticTool Changers, "Automatic/RoboticTool Changes", Tool Changer News. Downloaded from Internet Feb. 4, 2020. https://www.ati-ia.com/products/toolchanger/robot_tool_changer.aspx.
Dexai Robotics: "A Robot Company Is Born", retrieved from Internet from Feb. 5, 2020. https://draper.com/dexai-robotics.
Draper—"A 'Preceptive Robot' Earns Draper Spots as KUKA Innovation Award Finalist" Aug. 30, 2017, retrieved from Internet from Feb. 5, 2020. https://www.draper.com/news-releases/perceptive-robot-earns-draper-spot-kuka-innovation-award-finalist.
"Draper Spins Out Dexai Robotics", Mar. 21, 2019, retrieved from Internet from Feb. 5, 2020. https://www.draper.com/news-releases/draper-spins-out-dexai-robotics.
Dynamic Robotic Manipulation—KUKA Innovation—Finalist Spotlight—Apr. 26, 2018 retrieved from Internet Feb. 5, 2020. https://youtube.com/watch?v=7wGc-4uqOKw.
Siciliano, B., et al. "Chapter 8—Motion Control—Robotics Modelling Planning and Control", In: Robotics Modelling Planning and Control, Dec. 23, 2009.
Siciliano, B., et al. "Chapter 9—Force Control—Robotics Modelling Planning and Control", In: Robotics Modelling Planning and Control, Dec. 23, 2009.
International Search Report and Written Opinion for PCT/US2019/051040 dated Feb. 7, 2020 entitled "Manipulating Fracturable And Deformable Materials Using Articulated Manipulators".
International Search Report and Written Opinion for PCT/US2019/051180 dated Jan. 31, 2020 entitled "One-Click Robot Order".
International Search Report and Written Opinion for PCT/US2019/051061 dated Apr. 3, 2020 titled "Controlling Robot Torque And Velocity Based On Context".
Olin College of Engineering, "Autonomous Tool Changer" Draper 2016-2017, retrieved from Internet Feb. 5, 2020. http://www.olin.edu/sites/default/files/draperarchival2.pdf.
Olin College of Engineering, Autonomous Tool Changer, MoMap and the Future, "How Can We Enable a Robotic Arm to Change and Use Human Tools Autonomously". Date unknown.
Feddema, John T., et al., Model-Based Visual Feedback Control for a Hand-Eye Coordinated Robotic System, Aug. 1992, IEEE, vol. 25, Issue: 8, pp. 21-31 (Year: 1992).
Charabaruk, Nicholas; "Development of an Autonomous Omnidirectional Hazardous Material Handling Robot";. University of Ontario Institute of Technology (Canada). ProQuest Dissertations Publishing, 2015. 10006730. (Year: 2015).
Langsfeld, Joshua D.; "Learning Task Models for Robotic Manipulation of Nonrigid Objects"; University of Maryland, College Park. ProQuest Dissertations Publishing, 2017. 10255938. (Year: 2017).

\* cited by examiner

FOOD-SAFE, WASHABLE INTERFACE FOR EXCHANGING TOOLS

RELATED APPLICATIONS

This application claims the benefit of U.S. Provisional Application No. 62/730,703, filed on Sep. 13, 2018, U.S. Provisional Application No. 62/730,947, filed on Sep. 13, 2018, U.S. Provisional Application No. 62/730,933, filed on Sep. 13, 2018, U.S. Provisional Application No. 62/730,918, filed on Sep. 13, 2018, U.S. Provisional Application No. 62/730,934, filed on Sep. 13, 2018 and U.S. Provisional Application No. 62/731,398, filed on Sep. 14, 2018.

This application is related to U.S. patent application Ser. No. 16/570,100, U.S. patent application Ser. No. 16/570,855, U.S. patent application Ser. No. 16/571,003, U.S. patent application Ser. No. 16/570,915, U.S. patent application Ser. No. 16/570,976, U.S. patent application Ser. No. 16/570,736, U.S. patent application Ser. No. 16/571,025, U.S. patent application Ser. No. 16/570,606, U.S. patent application Ser. No. 16/571,040, and U.S. patent application Ser. No. 16/571,041, all filed on the same day, Sep. 13, 2019.

The entire teachings of the above applications are incorporated herein by reference.

BACKGROUND

Traditionally, quick service food restaurants (fast food) employs humans assembling ingredients from pre-prepared bins or containers into a meal. Robots have not yet been able to assemble meals from prepared ingredients as a whole.

SUMMARY

In embodiments, the below disclosure solves problems in relation to employing a food-safe tool changer in the quick service fast food restaurant environment. This device must enable a robot to detach and attach a variety of different tools for use in assembling and processing ingredients to prepare recipes. In order to effectively use a tool, the robot must have a rigid and geometrically deterministic interface between the tool and the robot. If the tool is not located where the programmer intended it to be, the robot will use the tool incorrectly when attempting to accomplish a task. The tool may collide with other objects in the workspace, as collision detection is performed using a geometric model of the robot and the tool, requiring an accurate attachment between the tool and the robot.

In an embodiment, a system includes an actuating rod, at least one ball bearing, and a housing having a first port to receive the actuating rod, and having a second port within the first port to receive the at least one ball bearing. The first port and second port of the housing are configured to allow motion of the actuating rod in a direction through the first port perpendicular to the at least one ball bearing in the second port. A distal end of the second port further has a hole with a constriction on the outer circumference of the housing. The constriction is configured to allow a portion of the ball bearing to extend out of the second port while holding the remaining portion of the ball bearing within the second port. The system further includes a utensil mating bracket having a reception port configured to receive the housing. The reception port having at least one locking member along an outer portion of the reception port, such that when the portion of the at least one ball bearing extends out of the second port, the locking member interfaces with the portion of the at least one ball bearing such that the housing is locked within the utensil mating bracket.

In an embodiment, the system further includes a compression spring within the housing. The compression spring is coupled with the actuating rod.

In an embodiment, the actuating rod is configured to extend through the housing such that it forces the at least one ball bearing through the second port such that the portion of the ball bearing extends out of the second port.

In an embodiment, the first port and second port have consistent diameters throughout lengths of the respective first and second ports.

In an embodiment, the at least one ball bearing is at least two ball bearings. The housing includes a third port within the first port to receive a second of the at least two ball bearings. The third port of the housing is configured to allow motion of the second ball bearing perpendicular to the motion of the actuating rod in the first port. A distal end of the third port further has hole with a constriction on the outer circumference of the housing. The constriction is configured to allow a portion of the second ball bearing to extend out of the third port while holding the remaining portion of the second ball bearing within the third port. When the portion of the second ball bearing extends out of the third port, the locking member interfaces with the portion of the at least one ball bearing such that the housing is locked within the utensil mating bracket.

In an embodiment, the utensil mating bracket further includes an actuator port configured to receive an actuator. The actuator can be a rotary actuator. The actuator can be configured to actuate a tool coupled with the utensil mating bracket. The actuator port can be a pneumatic port configured to provide air pressure to the tool in response to a command.

In an embodiment, a method includes providing an actuating rod, at least one ball bearing, and a housing. The method further includes receiving the actuating rod at a first port of the housing. The method further includes receiving, at a second port within the first port, the at least one ball bearing. The first port and second port of the housing are configured to allow motion of the actuating rod in a direction through the first port perpendicular to the at least one ball bearing in the second port. A distal end of the second port further has a hole with a constriction on the outer circumference of the housing. The constriction is configured to allow a portion of the ball bearing to extend out of the second port while holding the remaining portion of the ball bearing within the second port. The method further includes receiving the housing at a utensil mating bracket having a reception port. The reception port has at least one locking member along an outer portion of the reception port, such that when the portion of the at least one ball bearing extends out of the second port. The locking member can interface with the portion of the at least one ball bearing such that the housing is locked within the utensil mating bracket.

BRIEF DESCRIPTION OF THE DRAWINGS

The foregoing will be apparent from the following more particular description of example embodiments, as illustrated in the accompanying drawings in which like reference characters refer to the same parts throughout the different views. The drawings are not necessarily to scale, emphasis instead being placed upon illustrating embodiments.

DETAILED DESCRIPTION

A description of example embodiments follows.

Operating a robot in a food preparation environment, such as a quick service restaurant, can be challenging for several reasons. First, the end effectors (e.g., utensils), that the robot uses need to remain clean from contamination. Contamination can include allergens (e.g., peanuts), dietary preferences (e.g., contamination from pork for a vegetarian or kosher customer), dirt/bacteria/viruses, or other non-ingestible materials (e.g., oil, plastic, or particles from the robot itself). Second, the robot should be operated within its design specifications, and not exposed to excessive temperatures or incompatible liquids, without sacrificing cleanliness. Third, the robot should be able to manipulate food stuffs, which are often fracturable and deformable materials, and further the robot must be able to measure an amount of material controlled by its utensil in order to dispense specific portions. Fourth, the robot should be able to automatically and seamlessly switch utensils (e.g., switch between a ladle and salad tongs). Fifth, the utensils should be adapted to be left in an assigned food container and interchanged with the robot as needed, in situ. Sixth, the interchangeable parts (e.g., utensils) should be washable and dishwasher safe. Seventh, the robot should be able to autonomously generate a task plan and motion plan(s) to assemble all ingredients in a recipe, and execute that plan. Eighth, the robot should be able to modify or stop a motion plan based on detected interference or voice commands to stop or modify the robot's plan. Ninth, the robot should be able to minimize the applied torque based on safety requirements or the task context or the task parameters (e.g., density and viscosity) of the material to be gathered. Tenth, the system should be able to receive an electronic order from a user, assemble the meal for the user, and place the meal for the user in a designated area for pickup automatically with minimal human involvement.

Figure 1:
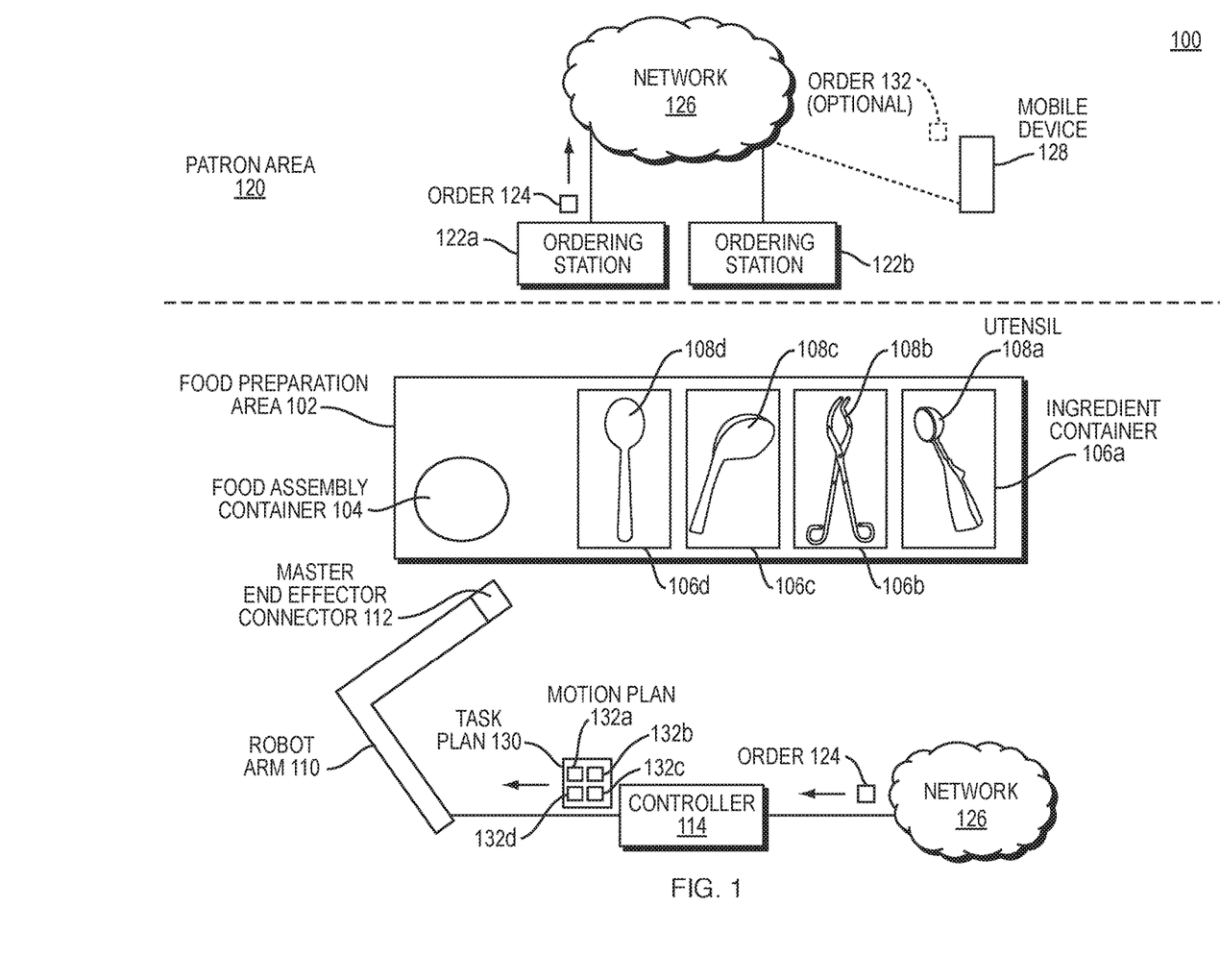
FIG. 1 is a block diagram illustrating an example embodiment of a quick service food environment of embodiments of the present invention.

FIG. 1 is a block diagram illustrating an example embodiment of a quick service food environment 100 of embodiments of the present disclosure. The quick service food environment 100 includes a food preparation area 102 and a patron area 120.

The food preparation area 102 includes a plurality of ingredient containers 106a-d each having a particular foodstuff (e.g., lettuce, chicken, cheese, tortilla chips, guacamole, beans, rice, various sauces or dressings, etc.). Each ingredient container 106a-d stores in situ its corresponding ingredients. Utensils 108a-d may be stored in situ in the ingredient containers or in a stand-alone tool rack 109. The utensils 108a-d can be spoons, ladles, tongs, dishers (scoopers), spatulas, or other utensils. Each utensil 108a-e is configured to mate with and disconnect from a tool changer interface 112 of a robot arm 110. While the term utensil is used throughout this application, a person having ordinary skill in the art can recognize that the principles described in relation to utensils can apply in general to end effectors in other contexts (e.g., end effectors for moving fracturable or deformable materials in construction with an excavator or backhoe, etc.); and a robot arm can be replaced with any computer controlled actuatable system which can interact with its environment to manipulate a deformable material. The robot arm 110 includes sensor elements/modules such as stereo vision systems (SVS), 3D vision sensors (e.g., Microsoft Kinect™ or an Intel RealSense™), LIDAR sensors, audio sensors (e.g., microphones), inertial sensors (e.g., internal motion unit (IMU), torque sensor, weight sensor, etc.) for sensing aspects of the environment, including pose (i.e., X, Y, Z coordinates and roll, pitch, and yaw angles) of tools for the robot to mate, shape and volume of foodstuffs in ingredient containers, shape and volume of foodstuffs deposited into food assembly container, moving or static obstacles in the environment, etc.

To initiate an order, a patron in the patron area 120 enters an order 124 in an ordering station 122a-b, which is forwarded to a network 126. Alternatively, a patron on a mobile device 128 can, within or outside of the patron area 120, generate an optional order 132. Regardless of the source of the order, the network 126 forwards the order to a controller 114 of the robot arm 110. The controller generates a task plan 130 for the robot arm 110 to execute.

The task plan 130 includes a list of motion plans 132a-d for the robot arm 110 to execute. Each motion plan 132a-d is a plan for the robot arm 110 to engage with a respective utensil 108a-e, gather ingredients from the respective ingredient container 106a-d, and empty the utensil 108a-e in an appropriate location of a food assembly container 104 for the patron, which can be a plate, bowl, or other container. The robot arm 110 then returns the utensil 108a-e to its respective ingredient container 106a-d, the tool rack 109, or other location as determined by the task plan 130 or motion plan 132a-d, and releases the utensil 108a-d. The robot arm executes each motion plan 132a-d in a specified order, causing the food to be assembled within the food assembly container 104 in a planned and aesthetic manner.

Within the above environment, various of the above described problems can be solved. The environment 100 illustrated by FIG. 1 can improve food service to patrons by assembling meals faster, more accurately, and more sanitarily than a human can assemble a meal. Some of the problems described above can be solved in accordance with the disclosure below.

Tool changers allow one mechanical robot or robot arm to exchange end effectors, and therefore be used for a variety of different purposes. For example, a robot arm with the ability to change end effectors can both grab an item with a claw and scoop an item with a scooper tool. The industry standard for tool changers does not provide product lines or models targeted at the food service industry, however. Available tool changer masters typically employ a metallic design for higher load industrial applications.

The present disclosure describes a food-safe tool changer that is constructed from low-load, food-safe materials. The disclosure further provides a degree of compliance to allow some misalignment when tool mating, which assists with automated tool mating. The invention further provides a food-safe shield to any accoutrements aimed at assisting the functionality of the tool changer master. A food-safe tool changer does not discard materials/shavings into the food, does not user non-edible lubricants, and all materials used are non-poisonous and/or edible.

For a robot arm to perform a task are traditionally configured with a specialized tool mounted to the end of the arm, referred to as an end-effector. Tasks also usually require more than one tool, and robots often are equipped with a flange that allows rapidly exchanging end-effectors. The flange is known as a tool-changer (see ATI Industrial Automation, etc.). Tool-changers are usually stiff, mechanically robust, able to be locked and un-locked using a remote actuation mechanism, and compatible with the environmental requirements of the task. In the restaurant embodiments of the present disclosure, the environmental requirements include being wash-down compatible food safe, and able to handle high temperatures, and other food-specific requirements.

Tool-changing has been around for as long as machine tools. Many tool changing standards currently exist for CNC (computer numerical control) machines with automatic tool changers (ATC).

Due to challenges of programming robot motion, much of the task complexity is often placed in the end-effector. Therefore, end-effectors are often complicated and contain many actuatable mechanisms and sensors. For the end-effectors to be exchangeable, existing tool changers contain a single mechanical locking mechanism and many pneumatic and electrical signal carrying accoutrements to pass to the tool.

Due to their complexity, these tools are expensive to develop and manufacture at scale. The goal of the present disclosure is to enable tool changing between tools that require actuation, without needing an actuator to be packaged on the tool side. Such a design removes complexity from each tool by adding features to the tool-changer master (e.g., the component which remains attached to the robot).

The disclosed invention adds a nested configurable drive shaft with rotational capabilities that is linked to a linear shaft which actuates the locking mechanism, in a similar fashion to existing tool-changers. This approach replaces electrical and pneumatic feedthroughs with a single additional mechanical connection, which reduces the tool complexity and thus drastically reducing the cost of the tool side implements. In effect, this approach enables robot to employ tools that are more replaceable or disposable, economically in-line with traditional kitchen utensils (e.g., spatulas, tongs, dishers, and spoons).

In addition to the problem described above, the industry standard for tool changers does not contain a product line targeted at the food service industry. Available tool changer masters typically utilize materials that are not food-safe and are not protected against foreign material ingress (e.g., food clogging the mechanism). The invention described is constructed from food-safe materials and contains various sealing features that protect from ingress and enable wash-down cleaning.

The present disclosure illustrates and describes two tool changer designs below. A first design is illustrated in FIGS. 2A-12. The first tool changer design employs an eccentric circle features to constrain the tool in the yaw axis (e.g., around the z-axis). The first tool changer design is illustrated with electric actuation. The first tool changer design is illustrated having an actuator packaged offset from the tool changer.

The second design is illustrated in FIGS. 13-19. The second design employs tetrahedral features to constrain a yaw axis (e.g., around the z-axis). The second design constraints other axes similarly to traditionally available tool changers. The second tool changer design is illustrated with pneumatic actuation. The second tool changer design is illustrated having a linear actuator packaged internal to the tool changer.

While the first and second tool changer design are described as above, a person having ordinary skill in the art may combine various features described herein of both designs into other designs to create other tool changer designs.

Figure 2A:
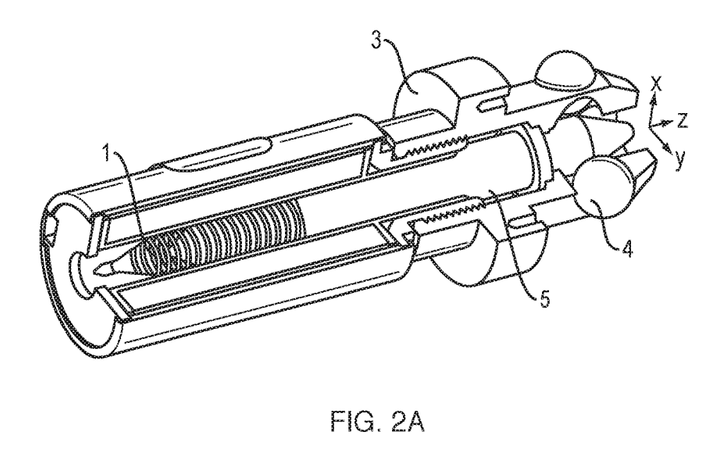
FIG. 2A is a diagram illustrating an isometric view of a tool changer in a locked position where an actuating rod is extended such that ball bearings 4 are expanded outwards.

FIG. 2A is a diagram illustrating an isometric view of a tool changer in a locked position where an actuating rod 5 is extended such that ball bearings 4 are expanded outwards. Compression spring 1 keeps the tool changer in this position during normal operation, which is advantageous to keep the ball bearing holes plugged for cleanability while the system is powered off and, in event of a power outage, to keep the tool attached to the robot. Ball bearing housing 3 holds the ball bearings captive and allows them to move into the locked and unlocked position without falling out of the housing. Ball hearing housing 3 also contains mounting features and compliant features that are described in further detail below.

Figure 2B:
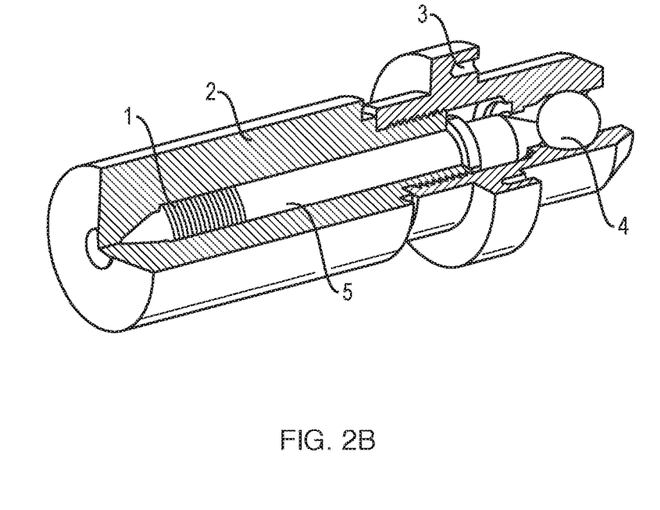
FIG. 2B is a diagram illustrating an isometric view of a tool changer in the unlocked position.

FIG. 2B is a diagram illustrating an isometric view of a tool changer in the unlocked position. The actuating rod 5 is retracted through the electrical activation of solenoid 2.

Figure 3:
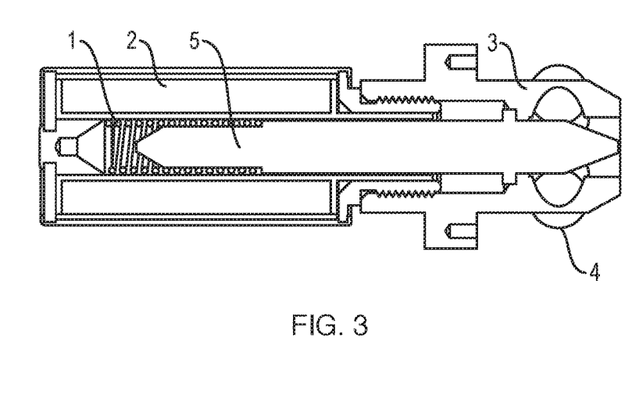
FIG. 3 is a diagram illustrating a side view of a tool position in a locked position, as described in FIG. 1.

FIG. 3 is a diagram illustrating a side view of a tool position in a locked position, as described in FIG. 1.

Figure 4:
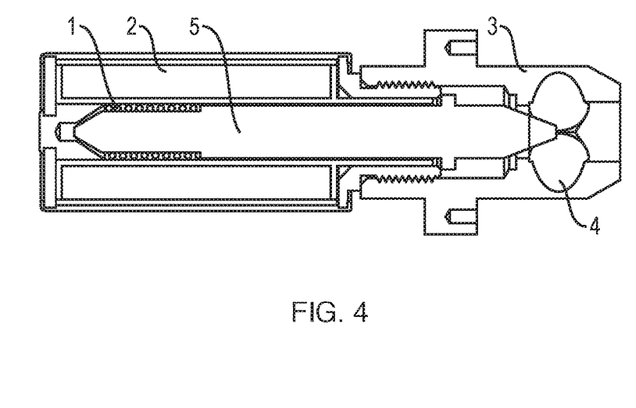
FIG. 4 is a diagram illustrating a side view of an unlocked position as described in FIG. 2.

FIG. 4 is a diagram illustrating a side view of an unlocked position as described in FIG. 2.

Figure 5:
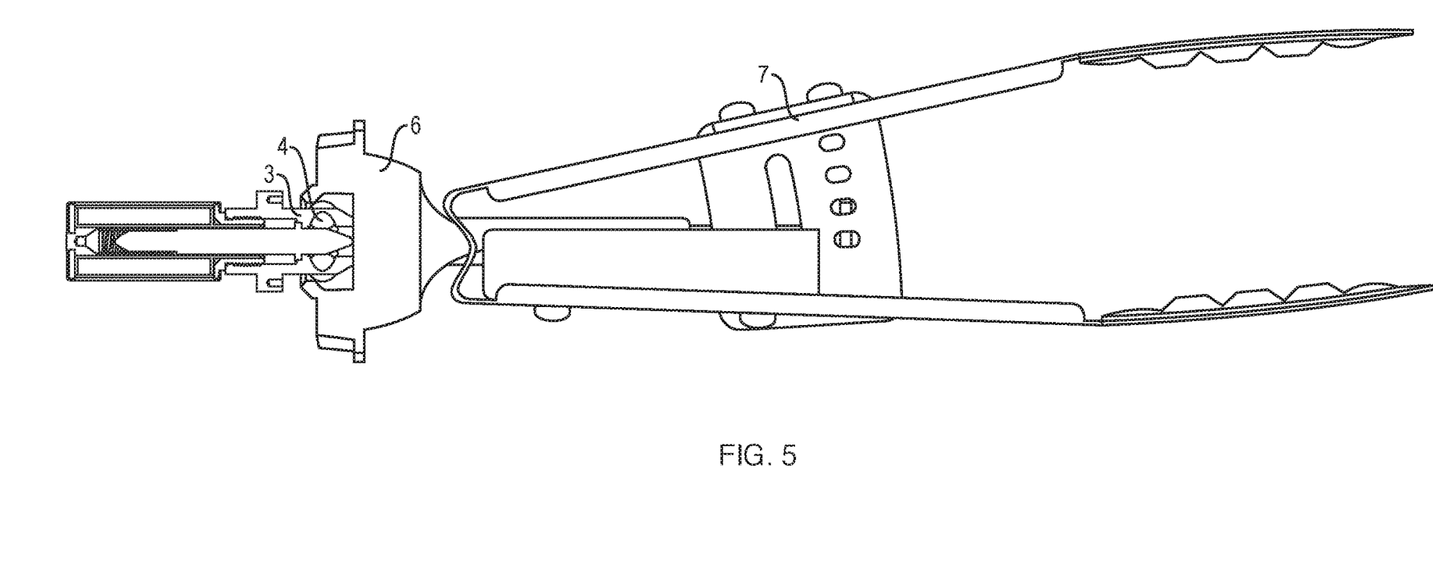
FIG. 5 is a diagram illustrating an example tool mated with the tool changer in the locked position.

FIG. 5 is a diagram illustrating an example tool mated with the tool changer in the locked position. Ball bearings 4 are engaged with the internal race feature of a tool mounting bracket 6. A tongs assembly 7 can be used for handling foodstuffs and can be interchanged with various other utensil assemblies.

Figure 6:
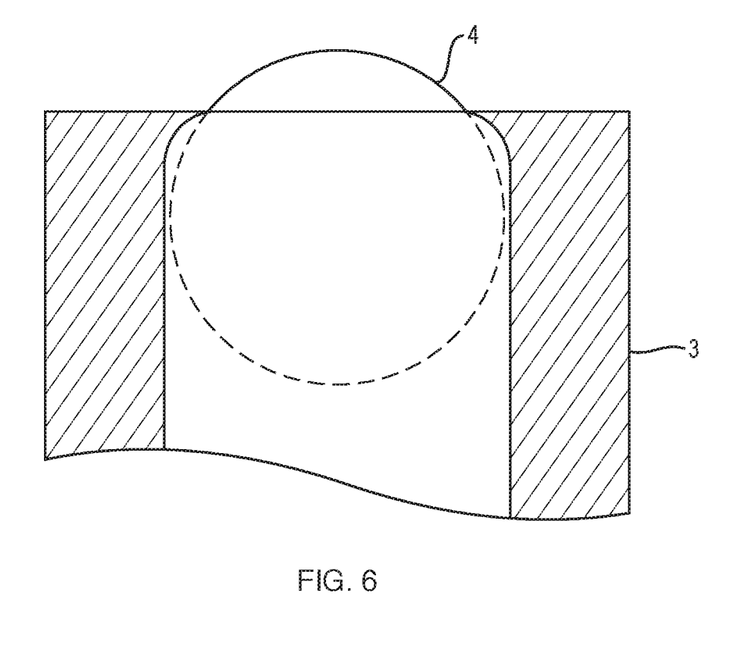
FIG. 6 is a diagram illustrating ball bearings being held captive in the ball bearing housing.
Figure 9A:
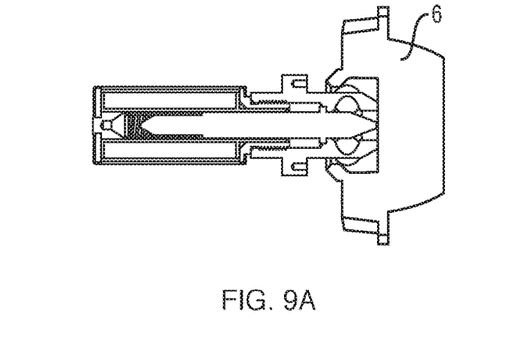
FIG. 9A is a diagram illustrating a locked position of the tool changer mating with the utensil mounting bracket.

FIG. 6 is a diagram illustrating ball bearings 4 being held captive in the ball bearing housing 3. The hole is a consistent diameter internally to allow the ball to move back and forth. The distal end of the hole includes a constriction in the hole diameter that prevents the balls from escaping. A person having ordinary skill in the art can recognize that when the actuator rod is pushed into an extended position, the ball bearings extend through the distal end of the hold and protrude through the housing. With the ball bearings protruding through the housing, as shown in FIG. 9A and described in further detail below, the housing of the actuator rod is locked within a utensil mating bracket.

Figure 7A:
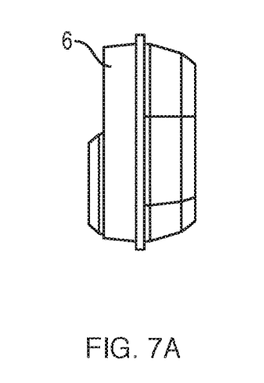
FIG. 7A is a diagram illustrating a side view of compliant and locating features included in a utensil mounting bracket.

FIG. 7A is a diagram illustrating a side view of compliance and locational features included in a utensil mounting bracket 6. FIG. 7A on the left-hand side illustrates a tapered geometry that allows sloped surfaces to act as cams with the mating piece to draw into the locked position.

Figure 7B:
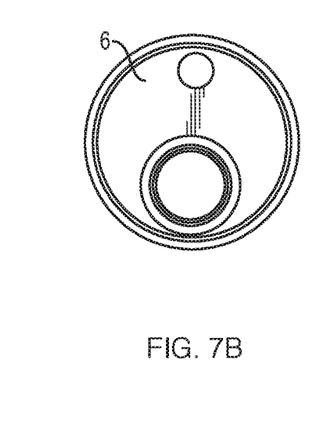
FIG. 7B is a diagram illustrating a front view of compliant and locating features included in a utensil mounting bracket.

FIG. 7B is a diagram illustrating a front view of compliant and locating features included in a utensil mounting bracket 6. Eccentric circles formed by the outer diameter and the tool changer race of utensil mounting bracket 6 locate the utensil mounting bracket 6 rotationally in the yaw direction.

Figure 8:
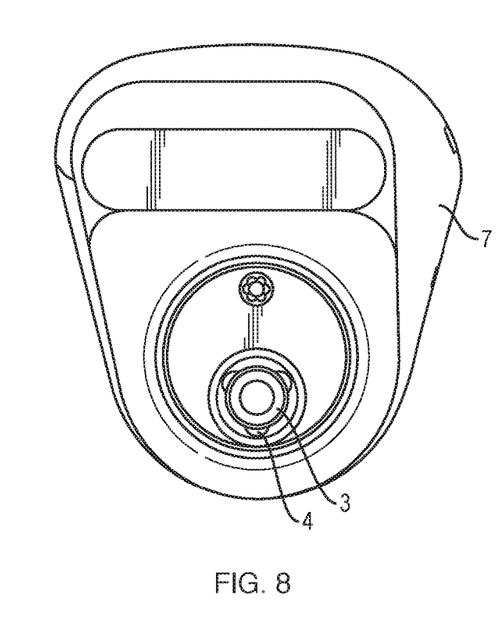
FIG. 8 illustrates an end-effector cover that provides locational and compliance features to draw the utensil mounting bracket into the correct position.

FIG. 8 illustrates an end-effector cover 7 that provides locational and compliance features to draw the utensil mounting bracket 6 into the correct position. The ball bearing housing 3 coupled with the circular outer diameter feature in the utensil mounting bracket 6 enable full constraint of the utensil. The tapered side wall features of end-effector housing 7 and recessed circular feature of utensil mounting bracket 6 outer diameter are compliant because bracket 6 can be misaligned positionally and rotationally from the central axis of the ball bearing housing along the z-axis, but still be mated properly upon approach.

FIG. 9A is a diagram illustrating a locked position of the tool changer mating with the utensil mounting bracket 6. As is shown, the actuator rod forces the ball bearings through their respective holes in the bearing housing to protrude and mate with the race of utensil mounting bracket 6. The ball bearings extend such that a lip, or restrictive member, of the utensil mating bracket, locks the housing of the actuator rod into place.

Figure 9B:
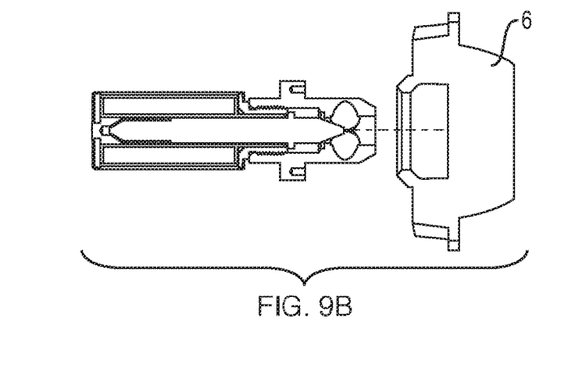
FIG. 9B is a diagram illustrating an unlocked position of the tool changer mating with the utensil mounting bracket.

FIG. 9B is a diagram illustrating an unlocked position of the tool changer mating with the utensil mounting bracket 6. To unlock the housing of the actuator rod, the actuator rod should be receded within the housing (e.g., through reducing tension on the spring via the solenoid or other means). The ball bearings then recede within the housing, and the housing is no longer locked within the utensil mating bracket.

Figure 10:
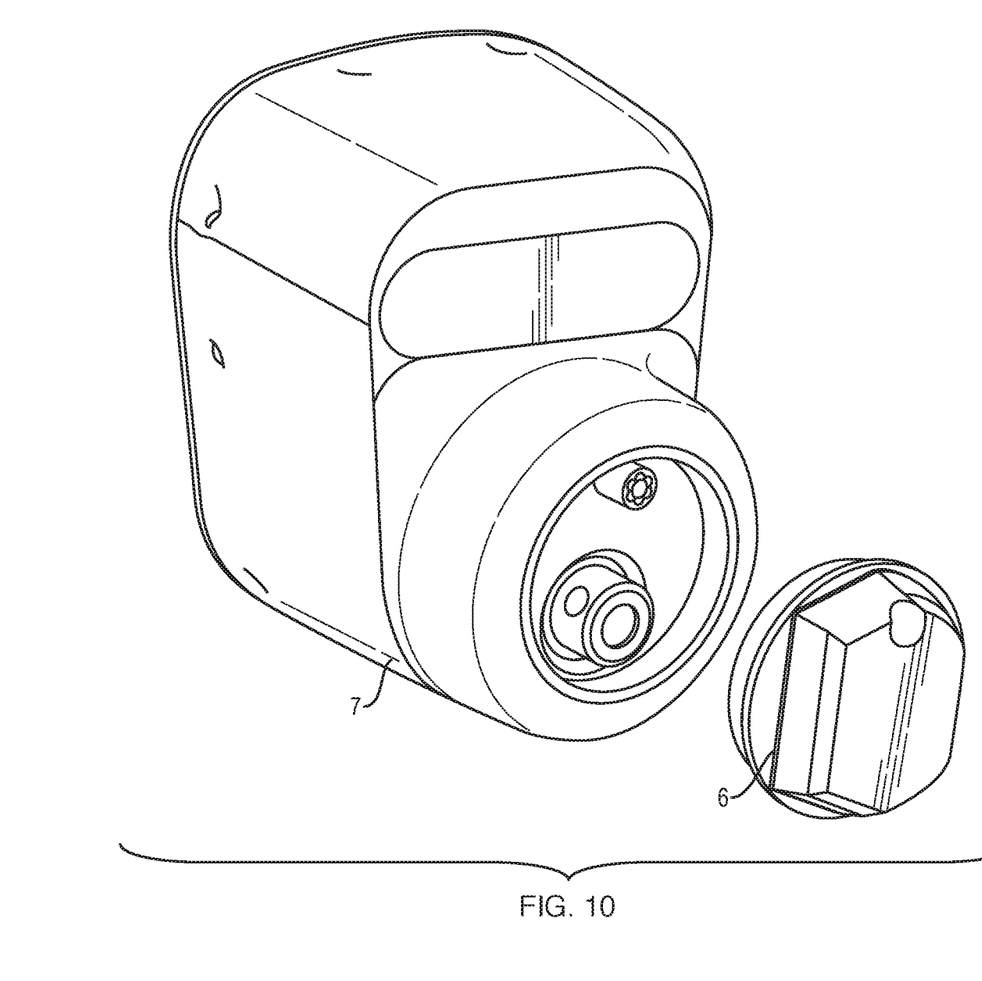
FIG. 10 is an exploded view diagram illustrating a mating paradigm between the utensil mounting bracket and an end-effector cover.

FIG. 10 is an exploded view diagram illustrating a mating paradigm between the utensil mounting bracket 6 end-effector cover 7.

Figure 11:
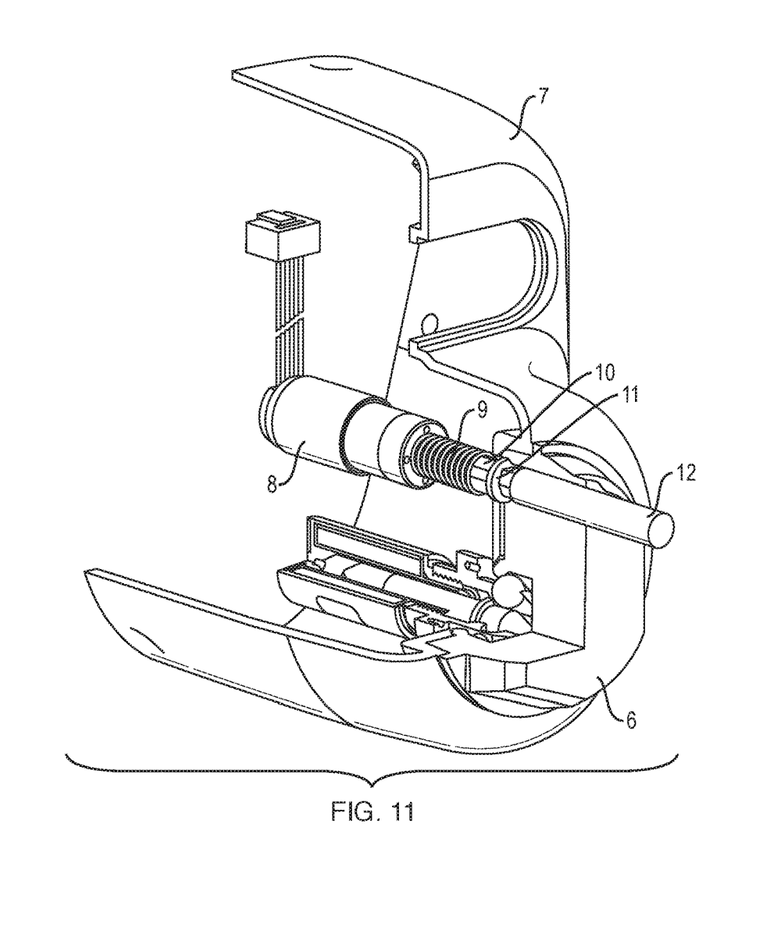
FIG. 11 is a diagram illustrating a rotary actuator packaged alongside the tool changer.

FIG. 11 is a diagram illustrating a rotary actuator packaged alongside the tool changer. A motor 8 may include a gearbox, encoder, or both. Spring 9 provides compliant coupling with a utensil driveshaft 12 to transfer rotational power, while remaining severable (e.g., disconnectable). Dog interfaces 10 and 11 (e.g., a dog clutch) enable removable rotational power transfer through use of a dog clutch mechanism.

Figure 12:
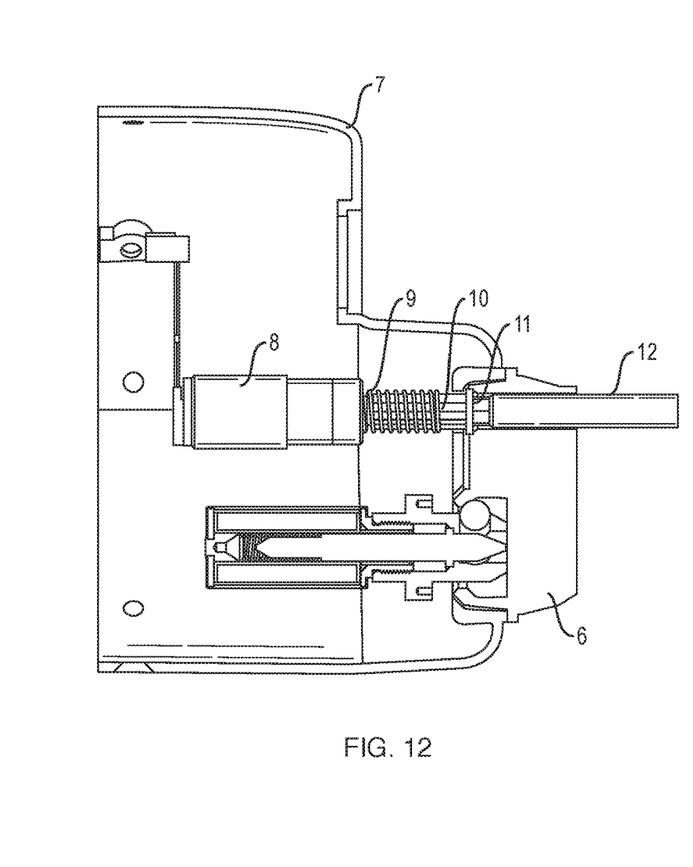
FIG. 12 is a diagram illustrating the rotary actuator from a different view.

FIG. 12 is a diagram illustrating the rotary actuator packaged alongside the tool changer from a different view.

Figure 13:
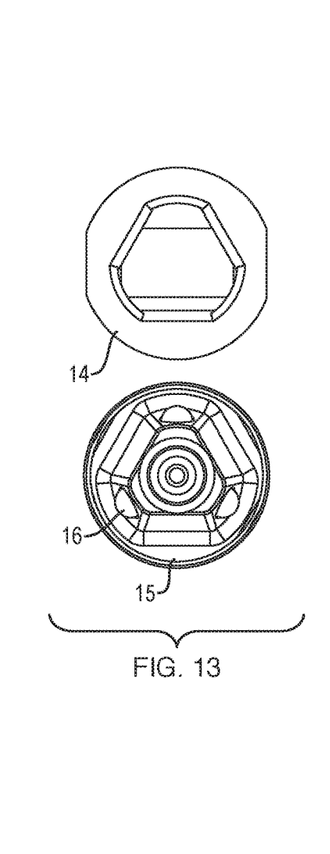
FIG. 13 is a diagram illustrating an additional geometry for constraining the utensils.

FIG. 13 is a diagram illustrating an additional geometry for constraining the utensils. The geometry is tetrahedral and the top is cut along an xy plane (see, e.g., FIG. 14's x-y-z triad for reference of the x-y plane in relation to the three-dimensional view of FIG. 14). A utensil mating bracket 14 has an internal race to accept ball bearings 16 to constrain in all degrees of freedom. Ball bearing housing 15 holds the ball bearings 16 captive and allows them to move into the locked and unlocked position without falling out of the housing. The holes for the ball bearings use similar features as is described in FIG. 6.

Figure 14:
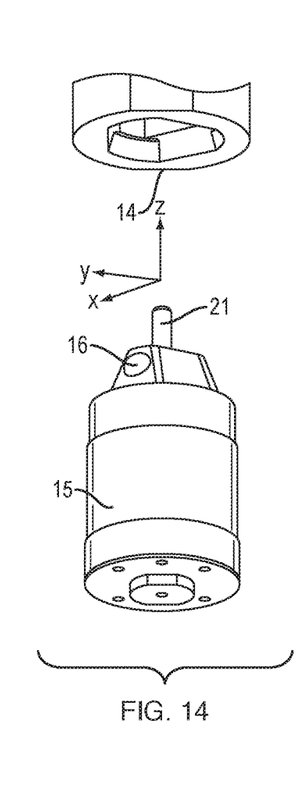
FIG. 14 is a diagram illustrating another tool changer geometry.

FIG. 14 is a diagram illustrating a different view of the same geometry shown in FIG. 13. The tetrahedral male feature of the ball bearing housing 15 accepts the tetrahedral female feature 14. This feature of the ball bearing housing 15 is compliant because the tetrahedral female feature 14 can be misaligned positionally and rotationally from the z-axis of the ball bearing housing, but still be mated properly upon approach.

Figure 15:
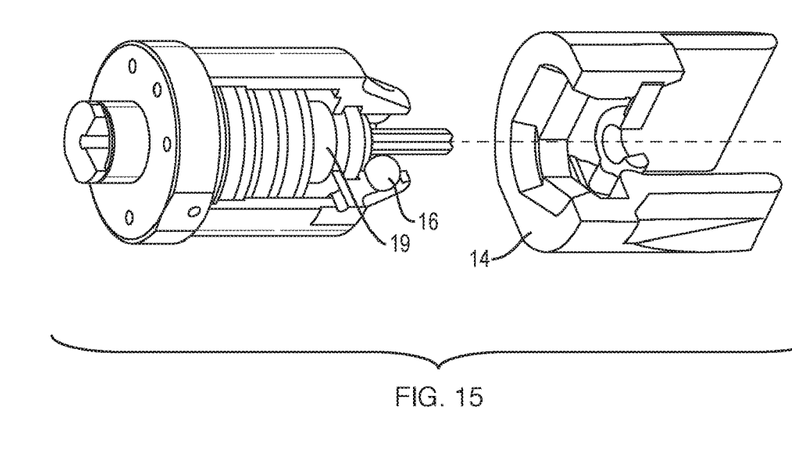
FIG. 15 is an exploded view diagram illustrating a mating paradigm between tool changer and utensil mounting bracket

FIG. 15 is a diagram illustrating a tool changer in an unlocked position. A tool changer actuation rod 19 is illustrated in a retracted position allowing ball bearings 16 to move inwards and enabling mating of a utensil mounting bracket 14. Tool changer actuation rod 19 is powered by air in the illustration of FIG. 19, but a person having ordinary skill in the art can understand that an electrically actuated version can be provided.

Figure 16:
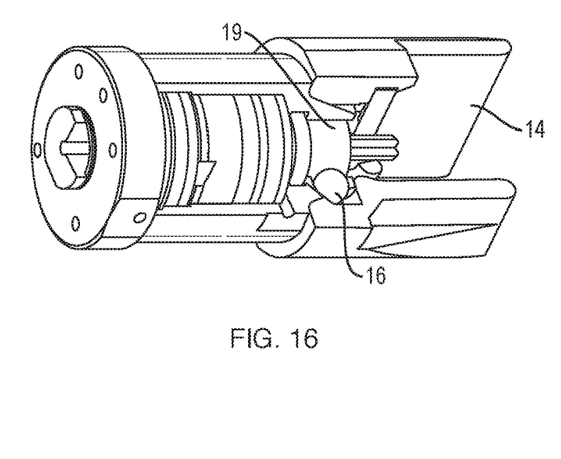
FIG. 16 is a diagram illustrating the tool changer in the locked position. Tool changer actuation rod 19 is in an extended position expanding ball bearings outwards.

FIG. 16 is a diagram illustrating the tool changer in the locked position. Tool changer actuation rod 19 is in an extended position expanding ball bearings 16 outwards. The ball bearings extend such that a lip, or restrictive member, of the utensil mating bracket, locks the housing of the actuator rod into place.

Figure 17:
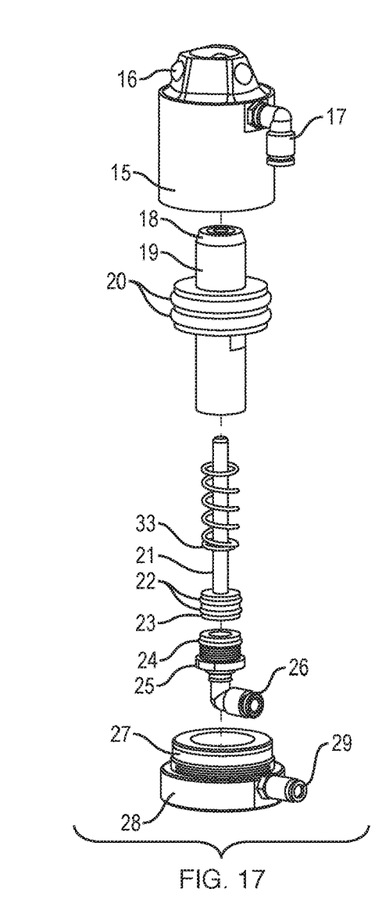
FIG. 17 is a diagram illustrating an exploded view of a second tool changer.
Figure 18:
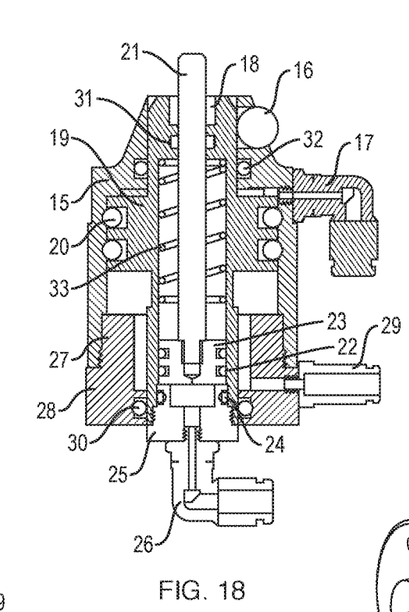
FIG. 18 is a cross-sectional diagram illustrating the second tool changer geometry.

FIG. 17 is a diagram illustrating an exploded view of a second tool changer. FIG. 18 is a cross-sectional diagram illustrating the second tool changer geometry. The outer actuation enabling the locking and unlocking of tools functions as follows. Ball bearing housing 15 and ball bearings 16 are described above. The tool changer unlock fitting 17 connects to a source of compressed air that actuates the tool changer actuation rod 19 into the unlocked position. The tool changer lock fitting 29 connects to a source of compressed air to drive the tool changer actuation rod 19 into the locked position, pushing the ball bearings 16 outwards and constraining a tool in place. Tool changer actuation rod dynamic o-rings 20 form a redundant seal to allow air actuation of the tool changer actuation rod 19. Ball bearing housing outer piston seal static o-ring 32 seals the piston from the environment and enables air actuation without leakage. Outer plug 28 is a plug that seals the outer piston from the environment through use of outer plug static o-ring outer 27 and outer plug static o-ring inner 30 and enables air actuation without leakage. Outer plug 28 enables assembly and mounting of the tool changer to an end effector housing.

Following FIG. 17 and FIG. 18, the inner actuation enabling the opening and closing of tongs functions as follows. Utensil actuation rod 21 screws into utensil actuation rod seal bracket 23. Utensil actuation rod seal bracket dynamic o-rings 22 form a redundant seal to enable air actuation of utensil actuation rod seal bracket 23 and utensil actuation rod 21, which are coupled together. Inner plug 25 seals the inner piston from the environment through use of utensil actuation rod static o-ring 31 and inner plug static o-ring 24. Inner plug 25 enables assembly of the inner components to be inserted within tool changer actuation rod 19. Other drive mechanisms could conceivably be inserted in this location, such as an electric motor or pneumatic rotary actuator. Utensil actuation fitting 26 connects to a source of compressed air that drives utensil actuation rod 21 and actuation rod seal bracket 23 outwards. Utensil actuation rod static o-ring 31 provides a seal on the top end of utensil actuation rod 21. A compression spring 33 is used to place utensil actuation rod seal bracket 23 and utensil actuation rod 21 normally in the retracted position. A linear, food-grade bearing 18 supports utensil actuation rod 21 and provides a guard from foodstuffs from entering the assembly.

Figure 19A:
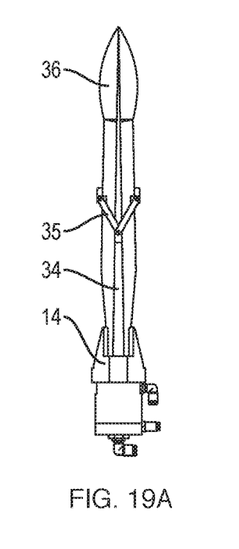
FIGS. 19A-D are diagrams illustrating the function of the tool changer's internal actuation scheme.
Figure 19B:
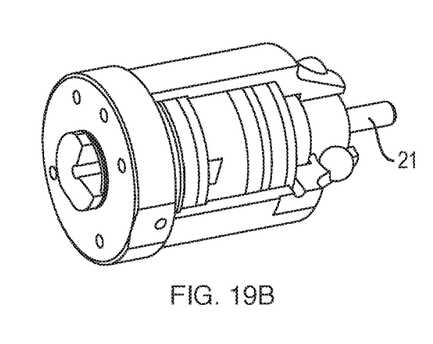

FIGS. 19A-D are diagrams illustrating the functionality of the tool changer's internal actuation scheme. FIG. 19A is a diagram illustrating an example utensil (e.g., tongs) in an unactuated, normally-closed position. The tongs are kept normally-closed through the use of flexure structures on the sides of utensil mounting bracket 14. FIG. 19B is a diagram illustrating the tool changer with utensil actuation rod 21 retracted, allowing the tongs to be closed. The actuation rod 21 is normally-retracted due to the compression spring 19 shown in FIG. 17 and FIG. 18.

Figure 19C:
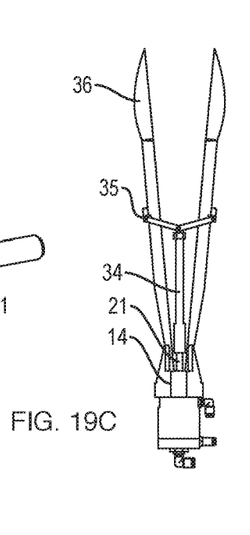
Figure 19D:
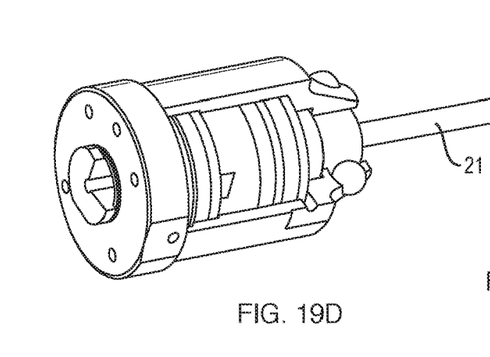

FIG. 19C illustrates the example utensil (e.g., tongs) open in the actuated position. FIG. 19D illustrates the tool changer having compressed air pushing the utensil actuation rod 21 outwards to move the tongs into the open position. The tool changer actuation rod 21 is removable from tongs extension rod 34 keeping the actuation on the maser side of the tool changer. When pushing outwards, power is transferred through hinge mechanism assembly 35 to open tongs 36.

The teachings of all patents, published applications and references cited herein are incorporated by reference in their entirety.

While example embodiments have been particularly shown and described, it will be understood by those skilled in the art that various changes in form and details may be made therein without departing from the scope of the embodiments encompassed by the appended claims.

What is claimed is:

1. A system comprising:
   an actuating rod;
   at least one ball bearing;
   a housing having a first port to receive the actuating rod, and having a second port within the first port to receive the at least one ball bearing, the first port and second port of the housing configured to allow motion of the actuating rod in a direction through the first port perpendicular to the at least one ball bearing in the second port, a distal end of the second port further having a hole with a constriction on the outer circumference of the housing, the constriction configured to allow a portion of the ball bearing to extend out of the second port while holding the remaining portion of the ball bearing within the second port;
   a utensil mating bracket having a reception port configured to receive the housing, the reception port having at least one locking member along an outer portion of the reception port, such that when the portion of the at least one ball bearing extends out of the second port, the locking member interfaces with the portion of the at least one ball bearing such that the housing is locked within the utensil mating bracket.

2. The system of claim 1, further comprising:
   a compression spring within the housing, the compression spring coupled with the actuating rod.

3. The system of claim 1, wherein the actuating rod is configured to extend through the housing such that it forces the at least one ball bearing through the second port such that the portion of the ball bearing extends out of the second port.

4. The system of claim 1, wherein the first port and second port have consistent diameters throughout lengths of the respective first and second ports.

5. The system of claim 1, wherein:
   the at least one ball bearing is at least two ball bearings,
   the housing includes a third port within the first port to receive a second of the at least two ball bearings, the third port of the housing configured to allow motion of the second ball bearing perpendicular to the motion of the actuating rod in the first port, a distal end of the third port further having hole with a constriction on the outer circumference of the housing, the constriction configured to allow a portion of the second ball bearing to extend out of the third port while holding the remaining portion of the second ball bearing within the third port;
   wherein when the portion of the second ball bearing extends out of the third port, the locking member interfaces with the portion of the at least one ball bearing such that the housing is locked within the utensil mating bracket.

6. The system of claim 1, wherein the utensil mating bracket further includes an actuator port configured to receive an actuator.

7. The system of claim 6, wherein the actuator is a rotary actuator.

8. The system of claim 6, wherein the actuator is configured to actuate a tool coupled with the utensil mating bracket.

9. The system of claim 8, wherein the actuator port is a pneumatic port configured to provide air pressure to the tool in response to a command.

10. A method comprising:
    providing an actuating rod, at least one ball bearing, and a housing;
    receiving the actuating rod at a first port of the housing;
    receiving, at a second port within the first port, the at least one ball bearing;
    wherein the first port and second port of the housing are configured to allow motion of the actuating rod in a direction through the first port perpendicular to the at least one ball bearing in the second port, a distal end of the second port further having a hole with a constriction on the outer circumference of the housing, the constriction configured to allow a portion of the ball bearing to extend out of the second port while holding the remaining portion of the ball bearing within the second port;
    receiving the housing at a utensil mating bracket having a reception port, the reception port having at least one locking member along an outer portion of the reception port, such that when the portion of the at least one ball bearing extends out of the second port, the locking member interfaces with the portion of the at least one ball bearing such that the housing is locked within the utensil mating bracket.

* * * * *